US006463550B1

(12) United States Patent
Cepulis et al.

(10) Patent No.: US 6,463,550 B1
(45) Date of Patent: Oct. 8, 2002

(54) COMPUTER SYSTEM IMPLEMENTING FAULT DETECTION AND ISOLATION USING UNIQUE IDENTIFICATION CODES STORED IN NON-VOLATILE MEMORY

(75) Inventors: Darren J. Cepulis, The Woodlands; Sid Young, Jr., Houston, both of TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/267,587

(22) Filed: Mar. 12, 1999

Related U.S. Application Data (63) Continuation-in-part of application No. 09/090,123, filed on Jun. 4, 1998.

(51) Int. Cl.[7] .................................................. G06F 11/34
(52) U.S. Cl. ....................................................... 714/25
(58) Field of Search ............................... 710/302, 304; 713/104, 1, 2, 100; 714/25, 37, 48, 2, 8, 43, 57, 723

(56) References Cited

U.S. PATENT DOCUMENTS

| | | | | |
|---|---|---|---|---|
| 4,654,852 A | * | 3/1987 | Bentley et al. | ................ 700/83 |
| 4,817,092 A | * | 3/1989 | Denny | |
| 4,964,130 A | * | 10/1990 | Bowden et al. | ............. 714/704 |
| 5,386,551 A | * | 1/1995 | Chikira et al. | |
| 5,537,596 A | * | 7/1996 | Yu et al. | |
| 5,596,716 A | * | 1/1997 | Byers et al. | .................. 714/48 |

(List continued on next page.)

OTHER PUBLICATIONS

*Computer System Implementing Fault Detection And Isolation Using Unique Identification Codes Stored In Non–Volatile Memory;* Darren J. Cepulis et al., Ser. No. 09/090,123, filed Jun. 4, 1998. US2001/0042225 A1.

*PCI Local Bus Specification, Production Version, Revision 2.0;* PCI Special Interest Group; Apr. 30, 1993; Sections 1.4 and 1.5.

*PCI Local Bus Specification, Production Version, Revision 2.0;* PCI Special Interest Group; Apr. 30, 1993; pp. 14, 65–69, 149–152, 154–158, 163, 166–168.

*Primary Examiner*—Paul R. Myers
(74) *Attorney, Agent, or Firm*—Conley, Rose & Tayon, P.C.

(57) ABSTRACT

A computer system implementing a fault detection and isolation technique tracks failed physical devices by error codes embedded in various component in the computer system. The computer system comprises one or more CPU's, one or more memory modules, a master control device, such as an I$^2$C master, and a North bridge logic device coupling together the CPU's, memory modules, and master control device. The master control device also connects to the CPU's and memory modules over a serial bus, such as an I$^2$C bus. Each component includes a nonvolatile memory coupled to the I$^2$C bus for storing error information. If a component fails, a CPU stores an error code into the nonvolatile memory via the I$^2$C bus. During initialization, the CPU creates a logical resource map which includes a list of logical addresses of all available (i.e., fully functional) devices. The logical resource map is provided to the computer's operating system which isolates failed devices by only permitting access to those logical devices listed as available. The computer may include a non-volatile memory device coupled to the CPU for storing a failed device log which includes a list of ID codes corresponding to failed physical devices. After a device is determined to be non-functional, one of the CPU's stores that device's unique ID code in the failed device log. During system initialization, the information in the failed device log is compared to the error information stored in the components to create the logical resource map.

29 Claims, 5 Drawing Sheets

U.S. PATENT DOCUMENTS

| | | |
|---|---|---|
| 5,598,528 A | 1/1997 | Larson et al. ........... 395/182.05 |
| 5,634,137 A | 5/1997 | Merkin et al. ............... 395/830 |
| 5,655,148 A | 8/1997 | Richman et al. ............ 395/828 |
| 5,692,189 A | 11/1997 | Lipe ........................... 395/651 |
| 5,740,354 A * | 4/1998 | Ben-Natan et al. |
| 5,748,980 A | 5/1998 | Lipe et al. .................. 395/828 |
| 5,751,936 A | 5/1998 | Larson et al. .......... 395/182.05 |
| 5,787,246 A | 7/1998 | Lichtman et al. ........ 395/200.5 |
| 5,793,979 A | 8/1998 | Lichtman et al. ...... 395/200.56 |
| 5,809,329 A | 9/1998 | Lichtman et al. ........... 395/828 |
| 5,974,546 A | 10/1999 | Anderson ...................... 713/2 |
| 6,000,040 A * | 12/1999 | Culley et al. .................. 714/31 |
| 6,032,271 A | 2/2000 | Goodrum et al. ............. 714/56 |
| 6,044,423 A | 3/2000 | Seo et al. ................... 710/103 |
| 6,122,756 A * | 9/2000 | Baxter et al. |
| 6,128,555 A * | 10/2000 | Hanson et al. |
| 6,226,700 B1 * | 5/2001 | Wandler et al. ............. 710/101 |
| 6,243,838 B1 * | 6/2001 | Liu et al. ...................... 714/57 |
| 6,282,459 B1 * | 8/2001 | Ballantine et al. .......... 235/375 |

\* cited by examiner

FIG. 5

COMPUTER SYSTEM IMPLEMENTING FAULT DETECTION AND ISOLATION USING UNIQUE IDENTIFICATION CODES STORED IN NON-VOLATILE MEMORY

CROSS-REFERENCE TO RELATED APPLICATIONS

This is a continuation-in-part application of patent application Ser. No. 09/090,123 filed Jun. 4, 1998.

STATEMENT REGARDING FEDERALLY SPONSORED RESEARCH OR DEVELOPMENT

Not applicable.

BACKGROUND OF THE INVENTION

1. Field of the Invention

The present invention generally relates to fault detection in computer systems. More particularly, the invention relates to the use of unique device identification codes stored in non-volatile memory to track failed devices in a computer system. Still more particularly, the present invention relates to a system in which failed components may be tracked physically through the use of stored or embedded identification codes.

2. Background of the Invention

A personal computer system includes a number of components with specialized functions that cooperatively interact to produce the many effects available in modern computer systems. These components typically include one or more central processing units (CPU's), an array of random access memory (RAM) modules, and certain peripheral devices such as a floppy drive, a keyboard, and a display. The components generally are interconnected by one or more "busses." A bus is a collection of digital signal lines over which data, address, and control signals are conveyed between devices connected to the bus according to a predetermined protocol. Examples of industry standard bus protocols include the Peripheral Component Interconnect (PCI) bus, the Industry Standard Architecture (ISA) bus, and Universal Serial Bus (USB).

For a computer system to operate successfully and efficiently, its components must function correctly. To ensure proper operation in the event of a failed component, the computer system must be capable of (1) detecting the failure, and (2) isolating the failed component so it is no longer accessed. Accordingly, many computer systems include logic for detecting when a device has failed and isolating the failed device to prevent its subsequent use by other devices (such as the CPU) in the computer system. Although the sophistication of personal computer systems continues to increase, there continues to be a concern that components may fail during operation. To protect against this eventuality, fault detection systems continue to play an important role in the operation of computer systems. The present invention relates to an improved fault detection and isolation technique.

To understand conventional fault detection and isolation schemes, it is important to understand the interaction between the computer's hardware components and the operating system (e.g., Windows® 95). Application software, such as a word processor or game, uses the operating system to access the computer's hardware components to manipulate data. For example, a particular application program may require access to data on a hard disk drive. The operating system translates a data access request from the application program into one or more device level operations to obtain the requested data for the application program. The application program need not access the hard disk directly, but does so indirectly via the operating system.

Many devices, such as system memory and the CPU are assigned a "logical" address during system initialization ("boot-up"). As such, it is common to refer to a "physical" device or a "logical" device; the physical device refers to the actual hardware device, and the logical device refers to the device as it is mapped into the logical address space. For example, system memory may comprise 4 megabyte (MB) dual in-line memory modules (DIMM's). Each physical DIMM, therefore, is a 4 MB "physical" DIMM. During boot-up, each physical DIMM is assigned a 4 MB logical address range. One physical DIMM might be assigned the 0–4 MB address range, while another DIMM might be assigned the 4–8 MB address range. The operating system accesses a particular memory location in each DIMM typically by using its starting logical address (0, 4 MB, etc.), and also an offset from the starting logical address to the targeted memory location.

Assigning logical addresses to physical devices permits efficient use of the computer's physical resources by the operating system and applications software. Software can then be developed to run on computers with different hardware configurations; the software need only be aware of the logical addresses of the various devices. Further, if a user moves a physical device from one location in the computer to a new location, the logical address assignment may change (during boot-up) and the computer's software and operating system will be unaffected other than being made aware of the device's new logical address.

Most computer systems run various tests during boot-up in a process generally referred to as "power on self test" (POST). The POST routines are part of the Basic Input Output System (BIOS) code that is stored in read-only memory (ROM) and executed by the CPU. During execution of the POST routines, the various devices in the computer system, such as the CPU and memory, are tested to ascertain whether each device is working properly. Different types of devices are tested in different ways. Memory, for example, is tested by writing (i.e., storing) a known test data value to the memory device to be tested, and then reading (i.e., retrieving) the data value from the memory device to ensure the value read matches the value written. If a match does not exist, the memory is deemed defective; otherwise, the device is assumed to be functional. A CPU typically includes logic to test itself. The operational state of a CPU can be ascertained by the BIOS code reading the contents of various status registers internal to the CPU that indicate the CPU's functional states. Device testing also occurs to a certain extent after POST while the computer system is undergoing normal operation.

After the computer's hardware devices are tested, the BIOS code provides the operating system with a Logical Resource Map (LRM) which includes the logical addresses of only those devices that are fully functional. The operating system will not permit access to those logical devices not listed in the LRM, thereby isolating those devices from use in the computer. Further, if a device fails during operation of the computer and the failure is detected, the logical resource map is changed to indicate to the operating system that the failed device is no longer available.

The CPU also uses the BIOS code to maintain a list of failed logical devices in a "failed device log" (FDL) stored in non-volatile memory (i.e., memory whose contents are not erased when power is removed from the device). During boot-up, the BIOS code reads the failed device log to determine which logical devices were previously reported as failed. As the BIOS code creates the logical resource map to be provided to the operating system, the BIOS code will not include those logical devices that have been reported previously as failed. Accordingly, fault detection and isolation involves determining that one or more of the computer devices is defective, and prohibiting further access to that device by the operating system even after the computer has been turned off and then re-started.

The user, however, may wish to take remedial actions when the computer reports the presence of a failed device. For example, if the BIOS code determines that a CPU is defective, the user may replace the defective CPU with a new CPU. If a memory device has failed, the user may wish to replace the defective memory device or simply add additional memory modules without removing the defective device. In some situations, only a portion of the memory device has failed and most of the memory locations in the memory device may still be fully functional. As such, the user may not wish to replace the memory device. Instead, the user may leave the partially defective memory device in the computer and add an additional memory device to make up for the loss of memory capacity resulting from the defective memory locations.

When repairs or alterations to the computer configuration are made, the possibility exists that the FDL will no longer match the physical configuration of the computer. The following examples illustrate this problem. If a user removes a defective device, such as a CPU, and replaces it with a new device, the new CPU likely will be assigned the same logical address as the defective CPU. The FDL identifies which logical devices had previously been reported as failed. Upon subsequent system initialization, the BIOS will read the FDL and erroneously determine that the device at that logical address is still defective. Further, the new logical CPU will not be included in the LRM. Unless the user tells the computer system that the defective CPU has been replaced, the operating system will not permit access to the new CPU simply because the logical address associated with that new device is still tagged as failed in the FDL, and accordingly is not included in the LRM. This erroneous result can be remedied by the user running a known utility program that resets the failed device log so that upon subsequent boot-up, the logical address associated with the replaced device is associated with a previously identified failed component. This solution, however, places a burden on the user to know that it is necessary to run such a utility program, to know which utility program to run, and how to run he program.

Another example of the mismatch that can occur between the physical configuration of a computer and the failed device log relates to the system memory. Most computer systems available today include system memory comprising one or more memory modules. The memory modules may be implemented as single in-line memory modules (SIMM's), dual in-line memory modules (DIMM's), or any other type of available memory technology. These memory modules typically include connectors that mate with corresponding connectors (commonly referred to as "slots") on the computer system "mother" board. Many computers include connectors for eight or more memory modules, although not all of the available slots need be populated with memory modules.

The BIOS code assigns a logical memory address range to each memory module on the mother board. If one of the memory modules is found to be defective and, instead of replacing the defective memory module, the user simply adds a new module, it is possible for the newly inserted memory module to be assigned the logical address range previously assigned (i.e., assigned the last time the computer was turned on) to the defective memory module. Further, the defective memory module may be given a logical address range different than previously assigned to the defective module and not previously tagged as failed in the failed device log. During subsequent boot-up, the BIOS will read the FDL and, unless a suitable utility program is run by the user, the BIOS will report to the operating system via the logical resource map that the newly inserted memory module is defective. This erroneous result occurred because the new memory module was assigned the logical address range previously assigned to the defective module. Further, the BIOS will also erroneously report to the operating system that the defective memory module is available for use because its logical address range had not been previously tagged as failed in the failed device log. These problems can be remedied by the user running a utility program to inform the BIOS code of the new memory configuration. As noted above, however, running the utility program places an undesirable burden on the user.

Accordingly, a computer system that solves the problems noted above would be beneficial. Such a computer system preferably would be capable of accurately tracking failed devices even if those devices have been replaced or assigned to different logical addresses. Further, the new computer system preferably reduces or eliminates the necessity of the user running utility programs when a physical device is removed or replaced or a new device is added to the computer. Despite the advantages that such a system would offer, to date no such system has been introduced.

BRIEF SUMMARY OF THE INVENTION

The deficiencies of the prior art described above are solved in large part by a computer system implementing a fault detection and isolation technique that tracks non-functioning physical devices by codes which are embedded, or otherwise stored, in particular computer components. Examples of such devices in which codes could be embedded include, for example, the CPU (or CPU's if multiple processors are included in the computer system), memory modules comprising the computer's main system memory, and peripheral components residing on an expansion bus. The use of embedded or storage codes enables the fault detection and isolation technique to track physical devices instead of logical devices.

In accordance with the preferred embodiment, the computer system comprises one or more CPU's, one or more memory modules, a master control device, such as an $I^2C$ master, and a North bridge logic device coupling together the CPU, memory modules, and master control device. The master control device also connects to the CPU and memory modules over a serial bus, such as an $I^2C$ bus. Each CPU and memory module, and any other device for which physical tracking is desired, includes an internal non-volatile memory storage unit. If the device fails, the computer system writes an error code or message to the internal memory storage unit. The error code identifies the device as failed and preferably indicates the cause or symptom of the failure. The error code also may contain any other desired information.

During system initialization, the CPU creates a logical resource map which includes a list of logical addresses of all available (i.e., fully functional) devices. The logical resource map is provided to the computer's operating system and only permits access to those logical devices listed as available in the logical resource map. To determine which components are working, the master control device searches the internal memory storage unit of each component for failure codes. If the master control device finds a failure code stored in one of the devices, the CPU omits the logical address associated with that physical device from the logical resource map. The operating system will prevent access to a logical device that is not listed in the logical resource map.

In an alternative embodiment, each physical device includes an ID code that uniquely identifies and distinguishes that device from all other devices in the computer system. The computer also includes a non-volatile memory coupled to the CPU by way of the North bridge device. After a device is determined to be non-functional, either during POST or during normal system operation, a CPU stores that device's unique ID code in a failed device log in the non-volatile memory. The CPU then creates or modifies the logical resource map according to the list of failed physical devices.

In accordance with the alternative embodiment, a CPU, during computer system initialization, reads the list of ID codes from the failed device log, and the master control device retrieves the ID code from each physical device connected to the master control device. The master control device provides the retrieved ID codes from each device to the CPU, which then compares the list of ID codes from the failed device log with the list of ID codes retrieved from the devices by the master control device. If one of the device ID codes matches an entry in the failed device log, the CPU omits the logical address associated with that physical device from the logical resource map. The operating system will prevent access to a logical device that is not listed in the logical resource map.

The centralized technique of using unique ID codes to maintain a failed device log may be combined with the more distributed approach of storing failure information directly in the computer components. During system initialization, the CPU creates a logical resource map based on ID codes in the failed device log and on error information stored in the individual components. If the data in the failed device log disagrees with the failure information stored within a particular component, then the failed device log preferably is updated to reflect the error information stored within the component. Thus, the failed device log is updated automatically during system initialization if a failed component is replaced with a working component.

Tracking failed devices using a failure code and/or an ID code unique to each device can eliminate the pitfalls associated with tracking logical devices. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

A better understanding of the present invention can be obtained when the following detailed description of the preferred embodiments is considered in conjunction with the following drawings, in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, r through an indirect electrical connection via other devices and connections.

DETAILED DESCRIPTION OF THE PREFERRED EMBODIMENTS

Figure 1:
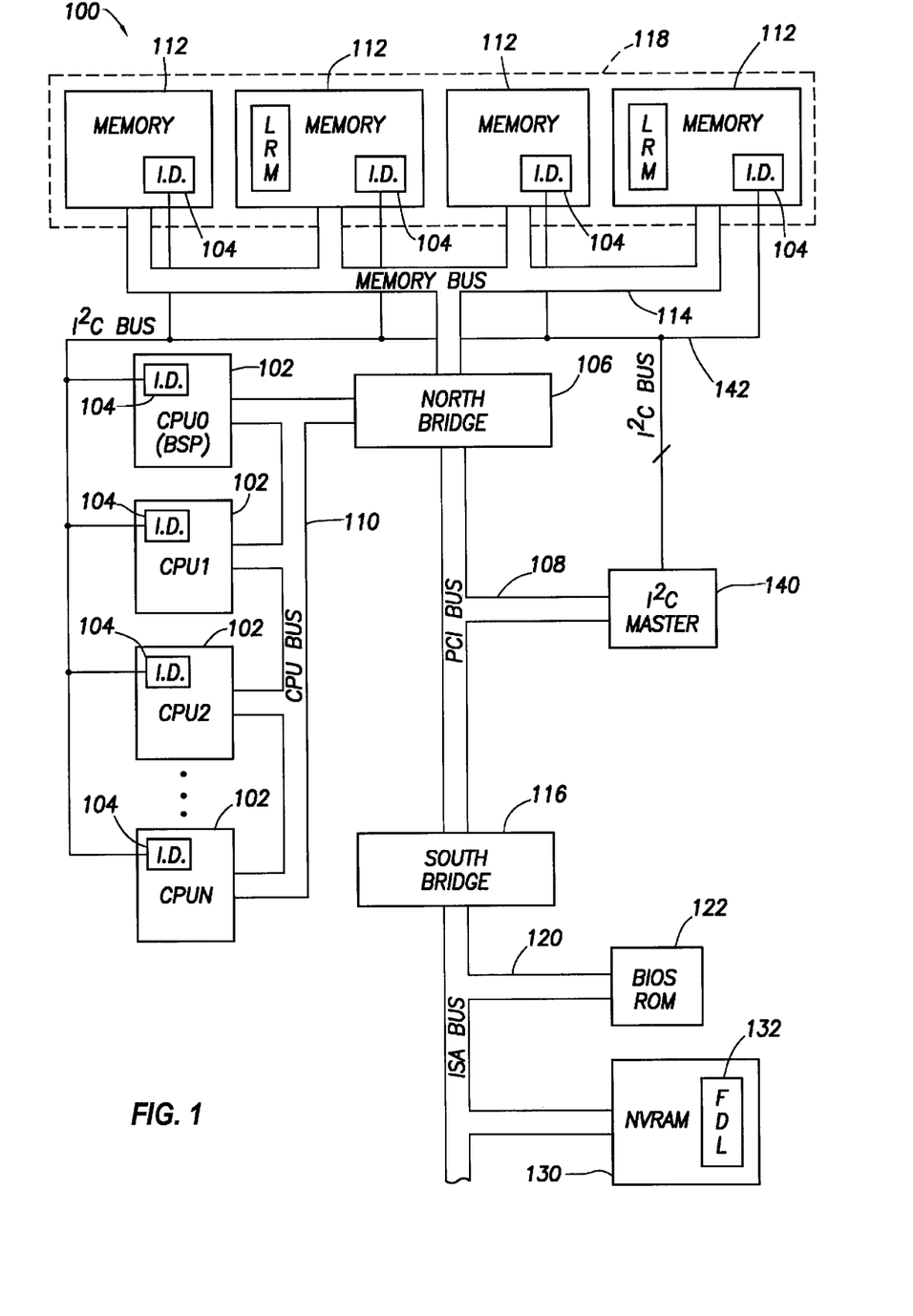
FIG. 1 is a block of a computer system constructed in accordance with the preferred embodiment and including devices with embedded identification numbers.

Referring now to FIG. 1, a computer system 100 constructed in accordance with the referred embodiment generally includes one or more CPU's 102, a system memory array 118, a North bridge logic device 106, a South bridge logic device 116, a BIOS ROM 122, a non-volatile Random Access Memory (NVRAM) 130, and an Inter Integrated Circuit (I$^2$C) master 140. It should be recognized that the architecture depicted in FIG. 1 is merely illustrative of one embodiment of the invention and that numerous other architectures are also possible and may be implemented in accordance with the present invention.

As shown in FIG. 1, the CPU's 102 are labeled as CPU 0, CPU 1, CPU 2, and CPU N. Although the preferred embodiment may include any number of CPU's, computer system 100 may include only one CPU if desired. In the following discussion, a single CPU will be referred to with the understanding that multiple CPUs could be provided in the computer system. The CPUs can be implemented using any suitable microprocessor, such as a Pentium® or Pentium® II (manufactured by Intel), or K6® (manufactured by Advanced Micro Devices). The Pentium® II architecture, for example, can support up to four CPU's (N=3).

The CPU 102 preferably connects to the North bridge 106 through a CPU bus 110. The North bridge 106 includes logic to couple the CPU 102, the memory array 118, and a primary expansion bus 108. The primary expansion bus 108 is depicted in FIG. 1 as a Peripheral Component Interconnect (PCI) bus, but any suitable expansion bus architecture can be used. The North bridge 106 preferably connects to the memory array 118 by way of memory bus 114. The North bridge device 106 facilitates the transfer of data and commands between devices connected to the CPU, memory, and PCI buses 110, 114, and 108, respectively. The North ridge 106, for example, permits the CPU 102 to communicate with the I$^2$C master 140. The North bridge 106 thus translates signals from one bus architecture to another bus architecture. The North bridge device 106 also preferably includes a memory controller (not specifically shown) for controlling access to the memory array 118 by the CPU 102 and other devices in the computer system that require access to memory.

Memory array 118 preferably includes one or more memory modules 112. The memory modules 112 may comprise any type of suitable memory technology currently known or subsequently developed such as Dynamic Random Access Memory (DRAM), Extended Data Out Dynamic Random Access Memory (EDO DRAM), and Synchronous Dynamic Random Access Memory (SDRAM). Further, the memory modules 112 may be packaged as Single In-Line Memory Modules (SIMM'S), Dual In-Line Memory Modules (DIMM'S), or any other type of physical architecture desired. The North bridge 106 provides a communication path through which information, such as status and configuration information, data, and code, can be written to or read from memory modules 112. For example, CPU-to-memory write commands (commands initiated by a CPU that include data to be stored in memory) are provided to the memory array 118 via the North bridge 106. The memory controller in the North bridge 106 processes the write commands from the CPU 102 and initiates communication with the memory array 118 to store the data.

The computer system 100 also preferably includes a South bridge 116 for coupling together the primary expansion bus 108 and a secondary expansion bus 120 as well as providing an interface to an input device 117 which may be a keyboard, mouse, joystick, or any other suitable input device. As shown, the secondary expansion bus 120 comprises an Industry Standard Architecture (ISA) bus, but can also implement other bus protocols such as the Extended Industry Standard Architecture (EISA) bus, the IEEE 1394 standard (or "FireWire") bus, or any of a variety of other busses that are presently available or may become available in the future. Although not shown, other busses, such as the Intelligent Device Electronics (IDE) bus and devices, such as a keyboard controller, may connect to the South bridge 116 as well. The terms "North" and "South" are used to refer to the North and South bridge devices 106 and 116, respectively, simply because of the relative locations these devices occupy in the block diagram of FIG. 1.

Referring still to FIG. 1, the BIOS ROM 122 and NVRAM 130 preferably couple to the South bridge 116 via the ISA bus 120. The BIOS ROM 122 contains firmware embedded on the ROM that performs a number of low-level functions. For example, the BIOS code performs the Power On Self Test ("POST") during boot-up to initialize and test the computer's hardware. The BIOS code also is responsible for loading the operating system into the computer's main system memory array 118. Further, the BIOS code handles the low-level input/output transactions to the various peripheral devices such as a hard disk drive (not shown). The BIOS code is accessed by issuing BIOS "calls," each call including a value to identify the type of transaction desired. Such BIOS calls are well known to those of ordinary skill in the art.

During the boot-up sequence, one of the CPU's 102 is designated as the "boot strap" processor and, as such, begins executing the boot-up code included as part of the BIOS ROM code. In FIG. 1, the boot strap processor (BSP) is shown as CPU 0. During the boot-up process, the boot strap processor (CPU 0) copies the BIOS code from the BIOS ROM 122 into the memory array 118. As subsequent calls to the BIOS code are required, such calls are then made to the copy of the BIOS code stored in the memory array 118.

Referring still to FIG. 1, each CPU 102 and memory module 112 includes a memory storage unit 104 for storing an identification (ID) code. Each memory storage unit 104 comprises a non-volatile memory device such as an Electrically Erasable Read Only Memory (EEPROM), battery backed-up RAM, or other type of memory component (e.g., a nonvolatile register) capable of retaining its contents without power. The ID code preferably permits the computer system to uniquely identify each physical device. Accordingly, each device includes an ID code that preferably is different from the ID codes of other devices in the computer system 100. The size of each ID memory unit 104 can be any suitable number of bits, and preferably includes a sufficient number of bits to permit the storage of an ID code with enough characters to distinguish each possible memory module and CPU. For example, each ID memory unit 104 may comprise 16 bytes of storage with each byte storing an ASCII character representing a single character in the device's ID code. Each ID memory unit 104 may be programmed by the manufacturer of the device or by the manufacturer of the computer system using known programming techniques. Further, the ID code may comprise the device's serial number or any other alphanumeric value that uniquely identifies the device. Additionally, one or more of the memory modules 112 includes a Logical Resource Map (LRM) which will be described below with reference to FIG. 2.

The use of a device ID code to solve the problems noted above will be explained in greater detail below. Generally, computer system 100 "tags" (i.e., identifies) a device that has failed using its unique ID code rather than the logical address associated with that physical device. In this way, if a failed device is replaced with a new device, the computer system will recognize that a new device has been inserted into the system by virtue of its unique identifier code. As such, the fault detection and isolation technique used in computer system 100 tracks failed physical devices, rather than failed logical devices. The preferred embodiment of the invention shown in FIG. 1 is illustrated only with respect to device ID codes stored in CPU 102 and memory modules 112. However, the use of a unique ID code identifier can be extended to other devices, such as extended memory on a PCI memory card, a floppy disk drive, or any other type of device desired.

The NVRAM 130 preferably stores configuration information and data that must be retained even after the computer is shut off (i.e. power is removed from the system). Such configuration information and data is used for configuring the computer system for general use. The NVRAM 130 preferably comprises an EEPROM, a battery backed-up RAM, or any other type of memory device whose contents are not lost when power is removed.

In accordance with the preferred embodiment of the invention, computer system 100 implements a suitable fault detection scheme to test various devices, such as the CPU 102 and memory modules 112, for defects. As noted above, the particular fault detection scheme used depends on the type of device to be tested. Any suitable technique for determining when a device has failed, can be employed. Regardless of which fault detection technique is used, computer system 100 determines whether a device has failed. The term "failed" is meant to refer to any device that falls short of full operational status, such as a device that is completely unable to function, partially unable to function, or is unable to communicate with other devices. The computer system 100 detects device failures preferably during POST and during normal system operation.

The NVRAM 130 also includes storage capacity for a Failed Device Log (FDL) 132. The FDL 132 includes a list of those components in the computer system 100 that have been tagged as failed. If a device is determined to be defective, one of the CPU's 102 places an entry into the FDL 132 identifying that physical device as failed. The "entry" into the FDL may simply include the unique ID code associated with the failed physical device. Thus, in accordance with the preferred embodiment, the devices identified as failed in the FDL 132 are listed according to the unique ID code for each failed device. Alternatively, the FDL entry to identify a failed physical device may include setting a bit in the FDL corresponding to the failed device. Moreover, any technique for identifying in the FDL which physical devices have failed is consistent with the principles of the present invention and this disclosure, and the claims that follow should be interpreted as including any such technique.

Referring still to FIG. 1, the I²C master 140 preferably connects to the PCI bus 108 and thus communicates with one or more of the CPU's 102 via North bridge 106. The I²C master 140 includes any suitable type of I²C bus master device such as PCD8584 manufactured by Philips. The CPU 102 preferably can program and read data from the I²C master 140. The I²C master 140 also preferably includes an interface to the I²C bus 142. Through the I²C bus 142, the I²C master connects to the memory modules 112 and the CPU's 102. The I²C bus 142 can also be routed to other hardware devices in the computer system for which fault detection and isolation is desired. The I²C master 140 preferably is capable of using the I²C bus to read the unique ID code stored in the memory unit 104 of each CPU 102 and memory modules 112. The ID code is supplied by the device to the I²C master 140 over the I²C bus 142 in response to a read command issued by the I²C master 140. The communication protocol for the I²C bus is described in "The I²C Peripherals for Microcontrollers Data Book," Signetics Philips Semiconductors, 1992. The I²C bus 114 generally permits the transfer of a single byte at a time across the bus. If an ID code comprises only a single byte value (or less than 8 bits) the I²C master 140 preferably transfers the byte to the boot strap processor (CPU 0) for comparison with the FDL 132 as described below. If an ID code, however, is large enough to require more than a single byte of storage in memory units 104, the transfer of the ID code requires the I²C master 140 to initiate the transfer of each byte of the ID code. After the I²C master 140 receives a byte representing a portion of an ID code for a device, that byte is transferred to the boot strap processor over the PCI bus 108, via the North bridge 106. The boot strap processor receives the bytes representing portions of the ID code, one at a time, from the I²C master 140 and concatenates the bytes together to reassemble the full ID code.

It should be recognized that the invention can be implemented with other bus architectures in place of the I²C bus 142. An example of alternative bus architectures include Microwire bus. If an alternative bus architecture is used, the I²C master 140 may be replaced with a suitable master for operating the selected bus.

The operation of computer system 100 to solve the problems noted above will now be described with respect to the block diagram of FIG. 1 and the flowchart 200 of FIG. 2. The boot strap CPU (CPU 0) executes BIOS code to perform the function of steps 202, 204, 206, 210, 212, 214, 216, and 218. The I²C master 140 preferably performs step 208. Flow chart 200 generally describes an initialization process for the computer system 100 during which the boot strap processor (CPU 0) creates or updates the Logical Resource Map (LRM) which is stored in memory array 118. The LRM contains a list of the logical devices that are available for use, (i.e. the logical devices that are not defective), and upon completion of the boot-up process, the BIOS provides the LRM to the operating system. The operating system prohibits the use of those devices that are not listed in the logical resource map.

Figure 2:
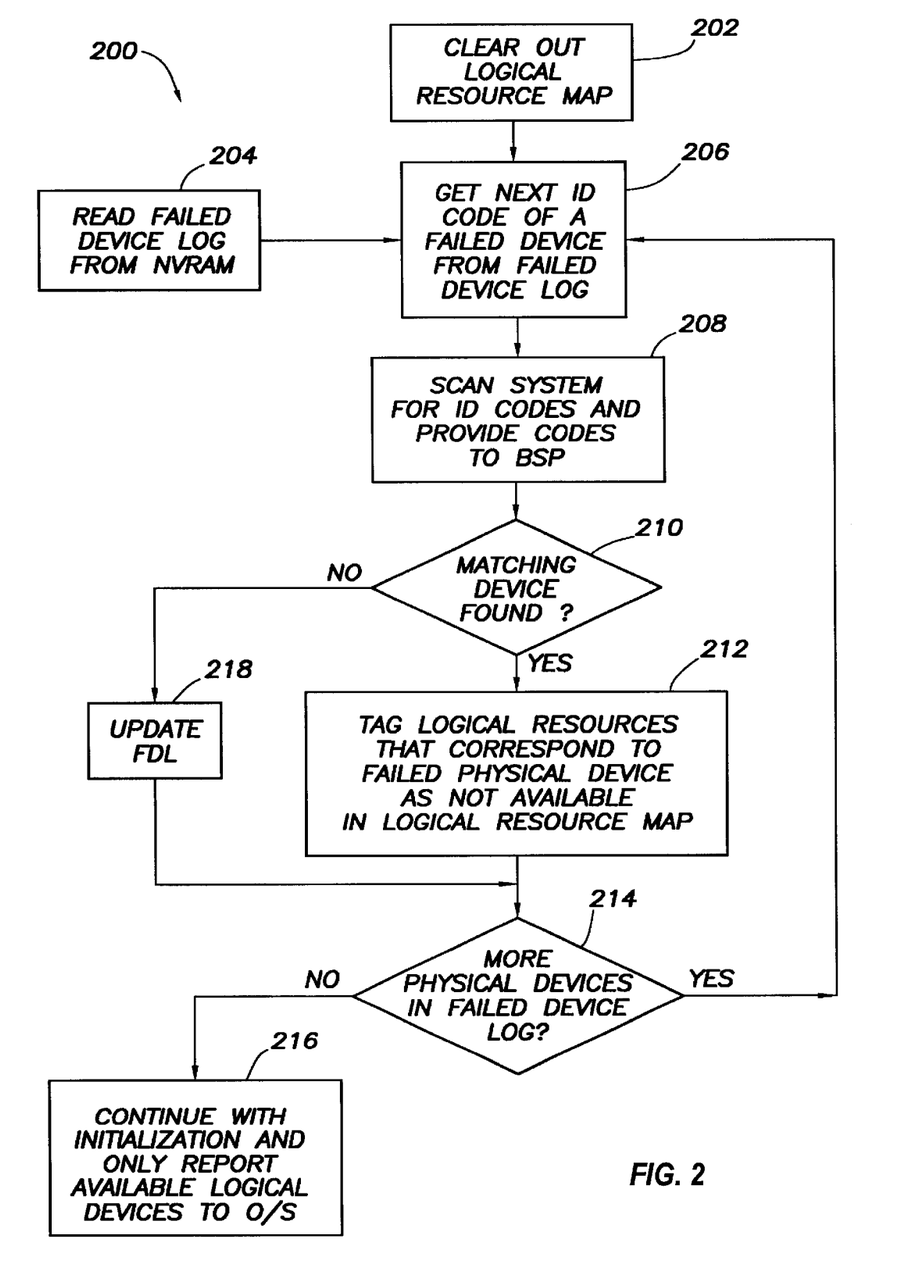
FIG. 2 is a flowchart representing a method for determining which devices in the computer system of FIG. 1 are available for use and which devices are defective.

In step 202 of FIG. 2, the LRM is cleared out (i.e. reset to indicate that all logical devices in the computer system are available to the operating system). In step 204, the BIOS code reads the FDL 132 from NVRAM 130 and preferably stores a copy of the FDL in system memory array 118. As noted above, the FDL 132 includes a list of the ID codes corresponding to those physical devices that previously have been tagged as failed. In step 206, the BIOS code (which is executed by the boot strap processor), examines the FDL 132 to obtain the next ID code of a failed device. The boot strap processor commands the I²C master 140 to read the ID codes from CPU's 102 and memory modules 112 (step 208). The I²C master 140 preferably provides the ID code values across the PCI bus 108, through the North bridge 106 and to the boot strap processor as described above.

In decision step 210, the boot strap CPU compares each ID code provided to it by the I²C master in step 208 with the ID code obtained from the FDL 132 in step 206. If no match is found, then the physical device corresponding to the ID code obtained in step 206 is no longer present in the computer system 100. Accordingly, the BIOS code updates the corresponding entry in the FDL 132 in step 218 to reflect that the physical device corresponding to the ID code provided to CPU 0 in step 206 is no longer present in the computer system. On the other hand, if a match is found in step 210, then the physical device corresponding to the ID code from step 206 is still present in the computer system (and presumably still defective) and the entry in the logical resource map corresponding to that physical device is tagged as failed in step 212 to indicate to the operating system that the device is not available.

After performing either step 218 or 212, depending on whether a match was found in step 210, control passes to decision step 214 in which the BIOS code determines whether there are any more failed physical devices listed in the FDL 132. If there is an additional device in the FDL 132, control passes back to step 206 and steps 208–212 are repeated. This process continues until the BIOS code determines that the FDL 132 does not include any more failed devices that have not yet been examined. At this point, the initialization process proceeds to step 216 in which the LRM is provided to the operating system and initialization continues.

Figure 3A:
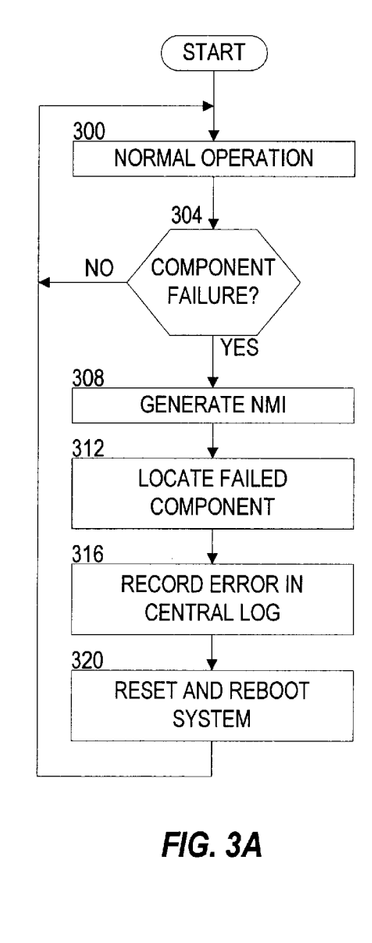
FIGS. 3A and 3B are flowcharts representing preferred methods for logging component failures in the computer system of FIG. 1.

The flowchart of FIG. 3A illustrates a preferred embodiment for recording component failures in the FDL 132. Block 300 represents normal computer system operation, which may comprise any number of computer modes including system bootup, POST, normal program execution, idle or sleep mode, low-power mode, or any other operating mode. If a component failure occurs during normal operation (block 304), then a non-maskable interrupt (NMI) signal is transmitted to a CPU 102 (block 308). A non-maskable interrupt signal may indicate a severe problem within the computer system 100 and typically suspends execution of the operating system software. Although the failing component itself typically will generate the NMI in response to the failure, any other component in the computer system 100 may generate the NMI as well. For instance, the memory controller in the North Bridge 106 may transmit an NMI if it detects problems (e.g., parity errors) during a transaction with the memory array 112. Also, certain devices residing on the PCI bus 108 or other expansion bus may monitor bus transactions and transmit an NMI in response to detecting an error in a bus cycle, even if the device transmitting the NMI was not involved in the bus transaction.

The CPU 102 responds to an NMI by executing a software program that is associated with the source of the NMI. The program is known as an interrupt service routine (ISR). The instructions for the interrupt service routine may be stored in any suitable memory device, such as the memory array 112 or the BIOS ROM, for example. As shown in blocks 312 and 316, the CPU 102 that receives the NMI in block 308 locates the failed component and records the ID code and the logical address of the failed physical device into the FDL 132. The failed component typically can be located, as in block 312, by determining the source of the NMI. Preferably, the interrupt service routine implements both blocks 312 and 316. Next, as shown in block 320, the computer system 100 resets and reboots. The operating system typically will suspend execution due to the NMI, and following a period of inactivity, the computer system 100 will automatically reset itself and reboot. As detailed in FIG. 2, the failed component will be mapped out of the system during the POST portion of the reboot sequence.

Figure 3B:
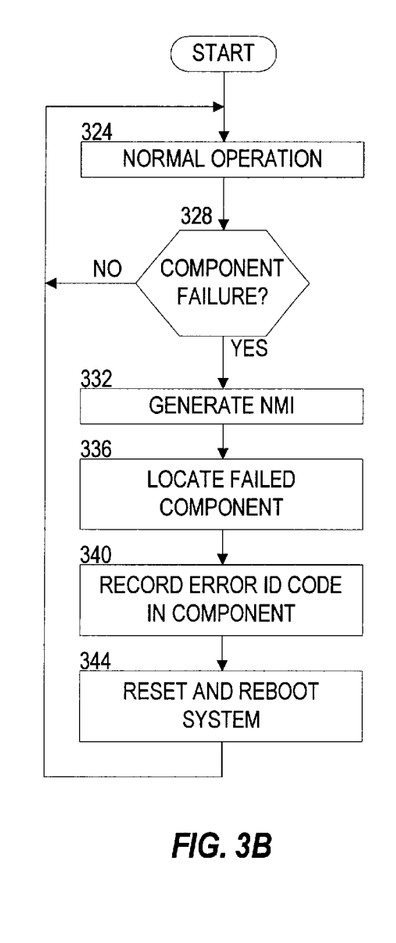

FIG. 3B illustrates an alternative embodiment for tracking failed components in which the computer system 100, upon detecting a failed device, stores a failure code into the storage unit 104 of the failed device, rather than in the FDL 132. The failure code indicates that a failure occurred and also preferably describes the type(s) of error(s) that caused the device to fail. Referring to FIG. 3B, block 324 indicates normal computer system operation. If a component fails during normal operation (block 328), then an NMI is generated to a CPU 102 (block 332). In response to the NMI, the CPU 102 locates the failed component (block 336) and records the failure code into the memory storage unit 104 of the failed device. If the nature of the failure can be determined, then the CPU 102 configures the failure code to identify the failure type. If the cause of the failure is unknown, then the failure code only indicates that the failure occurred. The failure code also may include other information as desired, such as system configuration information. System configuration information might include, for instance, the number of CPU's 102, the amount of memory 112, or the type and version of operating system software. Such information might aid a service technician in troubleshooting and fixing the failed component. Typically, the operating system software will suspend operation in response to the NMI after which the computer system 100 will automatically reset and reboot (block 344).

Because the error information for the various computer devices in the alternative embodiment of FIG. 3B is distributed throughout the system 100, use of the unique device ID code is optional in this embodiment (but may be implemented if desired). Accordingly, an embodiment of computer system 100 may optionally omit the FDL 132 if the device ID codes are not used. If unique device ID codes are implemented, then the failure code may be stored alongside or integrated with the unique ID code in any desired manner within the memory storage unit 104.

Figure 4:
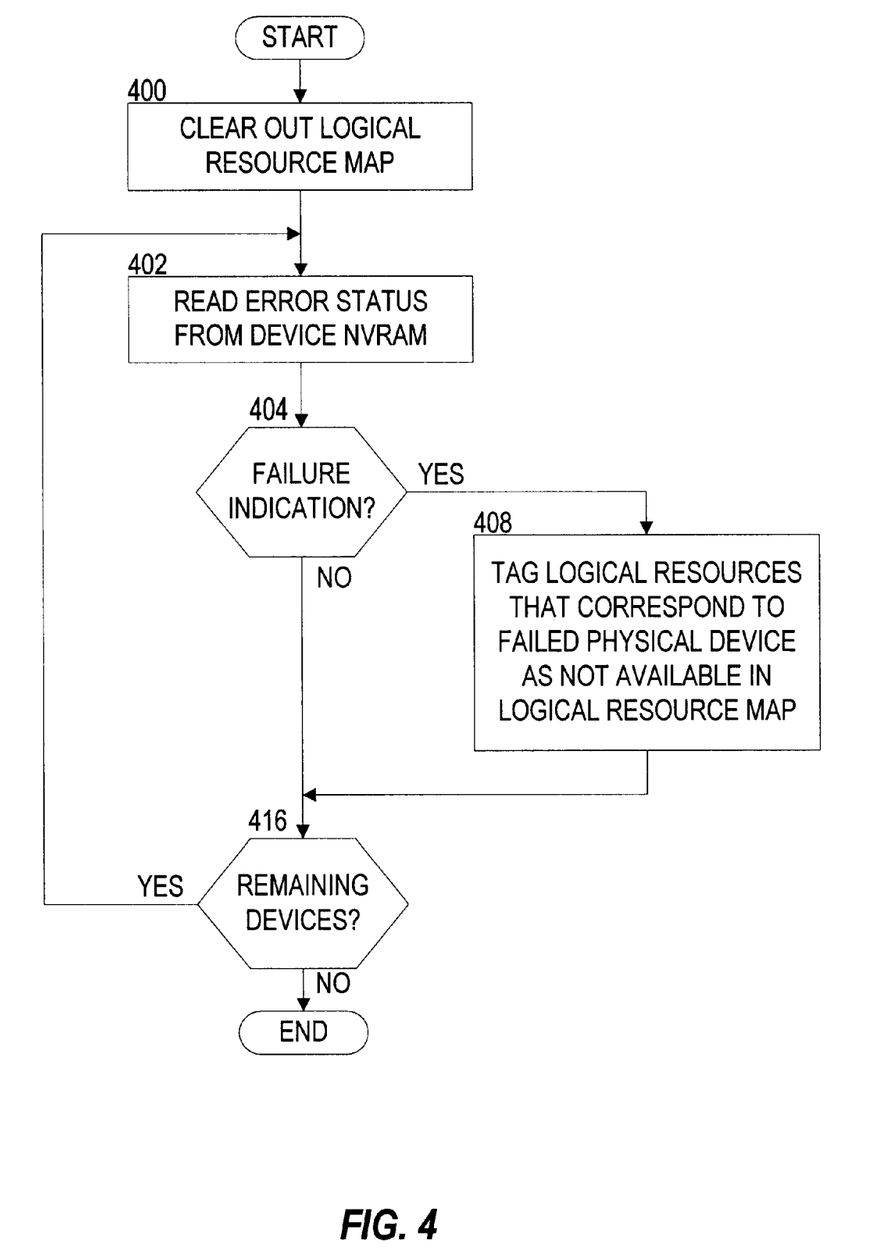
FIG. 4 is a flowchart representing a preferred method for determining which devices in the computer system of FIG. 1 are available for use and which devices are defective.

The flowchart of FIG. 4 illustrates how the computer system 100 logically maps out failed devices during POST, based on the failure code stored in each device. In block 400, the boot strap processor (CPU 0) resets the Logical Resource Map (LRM), stored in memory array 118, to indicate that all logical devices in the computer system are available to the operating system). Next, the I²C master 140 reads the memory storage unit 104 of each device in turn, to determine the error status of the various devices. Beginning in block 402, the I²C master 140 reads the error status from the memory storage unit of a first physical device. If the memory storage unit 104 of that device contains an error flag during block 404, indicating that the component has failed, then the boot strap processor configures the logical resource map in main memory 112 to indicate that the device has failed (block 408). Thereafter, the failed device will not be used by the computer system 100. Next, if there are any devices that have not been checked for failures (block 416), then the boot strap processor returns to bock 402 and reads the error status from the memory storage unit 104 of the next device. The boot strap processor and I²C master 140 then repeat blocks 402 through 416 until all of the devices have been checked.

Because the failure code indicates the nature of the error, a failed component may be shipped to a service technician who can diagnose the cause of the failure, and possibly repair the device, by reading the failure code from the memory storage unit 104. Further, if a user moves the failed device to another physical or logical location within the computer system 100, the device will remain tagged as a failed component, even if the FDL 132 is not updated to reflect the new device location.

Figure 5:
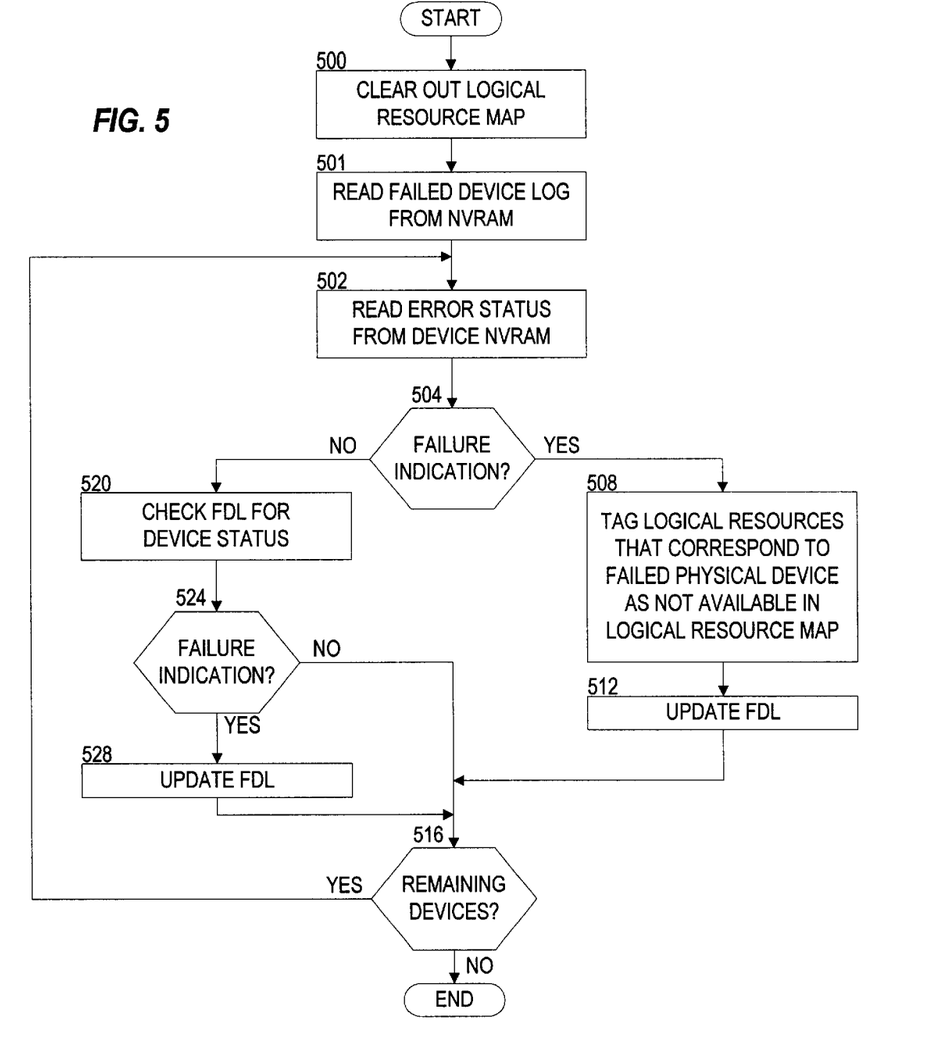
FIG. 5 is a flowchart representing a method for determining which devices in the computer system of FIG. 1 are available for use and which devices are defective.

The method of storing error information in each component provides a more decentralized way to track failed devices than does use of a failed device log. The two methods can be combined, however, without departing from the principles of the invention. FIG. 5 illustrates one such method, in which the FDL 132 is used to track failed devices along with the failure information stored in the individual storage units 104. Beginning in block 500, the boot strap processor (CPU 0) resets the Logical Resource Map (LRM), stored in memory array 118, to indicate that all logical devices in the computer system are available to the operating system). The boot strap processor, in block 501, then reads the FDL 132 from NVRAM 130 and stores a copy of the FDL in system memory array 118. As explained earlier, the FDL 132 includes a list of the ID codes corresponding to those physical devices that previously have been tagged as failed.

Next, the I²C master 140 reads the memory storage unit 104 of each device in turn, to determine the error status of the various devices. Beginning in block 502, the I²C master 140 reads the error status from the memory storage unit of a first physical device. If the memory storage unit 104 of that device contains an error flag during block 504, indicating that the component has failed, then the boot strap processor configures the logical resource map in main memory 112 to indicate that the device has failed (block 508). Thereafter, the failed device will not be used by the computer system 100. The boot strap processor then records the status of the failed device into the FDL 132 (block 512). The device may be logged in the FDL 132 according to its logical address, physical address, unique device ID, or any other identifier. Next, if there are any devices that have not been checked for failures (block 516), then the boot strap processor returns to bock 502 and reads the error status from the memory storage unit 104 of the next device. The boot strap processor and I²C master 140 then repeat blocks 502 through 516 until all of the devices have been checked.

If no device failure is detected during block 504, then the boot strap processor, in block 520, checks the FDL 132 to determine the status of the current device. If the FDL 132 indicates that the device has failed (block 524), then the boot strap processor corrects the status of the device in the FDL 132 (block 528) to show that the device is functioning properly (as determined previously in block 504). Control then proceeds to block 516, as described above.

As an alternative embodiment, the FDL could reside on any other bus in the computer system, rather than the ISA bus 120 as shown in FIG. 1. For example, the FDL could reside on the I²C bus 142. In this case, a CPU could read the FDL via the 12C master 140, or the I²C master 140 could be intelligent enough to read the log and isolate the failed physical devices itself. In this case, the CPU would still build the logical resource map for the operating system.

By using a unique identifier and/or a failure code embedded in each CPU, memory module, and any other desired device, computer system 100 solves the problems noted above by tracking failed physical devices instead of logical devices. As such, if a failed physical device is removed or replaced with a new device that is assigned to the same logical address as the failed device, the computer system will recognize the presence of the new device. Further, if a memory module fails and, rather than replacing that memory module, the user simply adds an additional memory module to the system, computer system 100 will be able to track which memory module is defective by its unique identifier and/or failure code. Moreover, the user need not run a separate utility program after replacing a failed device, adding a new device, or logically or physically relocating a failed device within the computer system, thus alleviating the inconvenience and other problems associated with conventional computer systems.

The above discussion is meant to be illustrative of the principles of the present invention. However, numerous variations and modifications will become apparent to those skilled in the art once the above disclosure is fully appreciated. It is intended that the following claims be interpreted to embrace all such variations and modifications.

We claim:

1. A computer system, comprising:
   a processor capable of executing program instructions;
   a main memory device coupled to said processor, said main memory device capable of storing data and program instructions;
   a plurality of electronic devices coupled to said processor and said main memory device, each of said electronic devices including an internal nonvolatile memory for storing error information;
   said processor capable of storing an error code into said internal memory if a failure occurs in said electronic device;
   an input device operatively coupled to said processor;
   a non-volatile memory coupled to said processor in which a failed device log is stored;
   wherein said processor is capable of logically isolating said electronic device from the computer system if said internal nonvolatile memory contains an error code indicating a failure of the electronic device containing the nonvolatile memory; and
   wherein said processor updates said failed device log upon isolating a failed device and upon replacement of a failed device with a functional device.

2. The computer system of claim 1 including a master control device coupled to said processor for reading and writing error codes to the internal memory of said electronic device.

3. The computer system of claim 2 including a serial bus for communication between said processor, said master control device, and said electronic device.

4. The computer system of claim 3 wherein said processor checks each of said electronic devices for error codes during system initialization.

5. The computer system of claim 4 wherein said processor, during system initialization, logically isolates electronic devices containing error codes.

6. The computer system of claim 4 wherein the nonvolatile memory of each of said electronic devices stores a unique memory ID code, and wherein each record includes the unique memory ID code of the failed device.

7. The computer system of claim 3 wherein said serial bus comprises an I²C bus.

8. The computer system of claim 1 further including an expansion bus coupled to said processor and wherein said electronic device comprises a peripheral device coupled to said expansion bus.

9. The computer system of claim 1 wherein said electronic device comprises a memory device.

10. A method for managing a plurality of components in a computer system, each of said components including an internal nonvolatile memory, said method comprising:
    (a) scanning the internal nonvolatile memory within each of said plurality of components for failure codes;
    (b) preventing the use of a component whose internal memory includes a failure code; and
    (c) updating a failed device log upon preventing use of a failed device and upon replacement of a failed device with a functional device.

11. The method of claim 10 wherein the failure code indicates the cause of the component failure.

12. The method of claim 10 further including:
    (d) creating a logical resource map of components, said map including the logical address associated with each of said components, wherein (b) comprises tagging said component within the logical resource map.

13. The method of claim 12 wherein (a), (b), (c) and (d) occur during system initialization.

14. The method of claim 10 further comprising detecting a failed component during normal computer operation and storing a failure code within the internal memory of said failed component.

15. The method of claim 14 wherein detecting a failed component comprises:
    receiving an interrupt signal that indicates component failure; and locating the source of said interrupt signal.

16. The method of claim 10 wherein (c) comprises:
    adding a component to the log if the internal memory of that component includes a failure code.

17. The method of claim 16 wherein (c) further includes removing a component from the log if the internal memory of that component does not include a failure code.

18. The method of claim 17 wherein each computer system component includes a unique device ID code, and wherein the log identifies failed devices according to device ID codes.

19. The method of claim 10 wherein step (a) includes reading the internal memory of each component using a serial bus connection between a processor and said component.

20. The method of claim 19 wherein said serial bus comprises an I²C bus.

21. The method of claim 10 wherein said component comprises a memory device.

22. A computer system, comprising:
    a primary bridge logic device for coupling a plurality of processors and memory modules to an expansion bus;

a primary expansion bus coupled to said primary bridge logic device;

a secondary bridge logic device coupled to said primary expansion bus;

a secondary expansion bus coupled to said secondary bridge logic device;

a BIOS ROM coupled to said secondary expansion bus;

a plurality of system components each comprising an internal nonvolatile memory array for storing status codes, including:

a plurality of processors coupled to said primary bridge logic device and capable of executing program instructions;

a memory module coupled to said primary bridge logic device and capable of storing data and program instructions; and a peripheral device coupled to said primary expansion bus; and wherein one of said processors, during system initialization, checks the internal non-volatile memory arrays of each of said system components for a status code indicating that the component has failed, and wherein said processor logically removes from said computer any failed system component and updates a failed device log stored in non-volatile memory.

23. The computer system of claim 22 wherein said processor, during system initialization, creates a logical resource map identifying the logical addresses of said system components, and wherein said processor logically removes said failed component by omitting said component from the logical resource map.

24. The computer system of claim 23 further including a serial bus that connects said system components, wherein said processor reads and writes to said nonvolatile memory arrays over said serial bus.

25. The computer system of claim 24 wherein said serial bus comprises an $I^2C$ bus.

26. The computer system of claim 22 wherein said processor stores a failure status code into the nonvolatile memory array of a failing system component if said component fails during normal computer system operation.

27. The computer system of claim 26 wherein said processor stores the unique ID code of a failed system component into said failed device log if said failed system component fails during normal computer system operation.

28. The computer system of claim 26 wherein said processor loads the unique ID code of a system component into said failed device log during system initialization if the nonvolatile memory array of said system component includes a failure status code.

29. The computer system of claim 26 wherein said processor removes the unique ID code of a system component from said failed device log during system initialization if the nonvolatile memory array of said system component does not include a failure status code.

* * * * *

UNITED STATES PATENT AND TRADEMARK OFFICE
CERTIFICATE OF CORRECTION

PATENT NO. : 6,463,550 B1
DATED : October 8, 2002
INVENTOR(S) : Darren J. Cepulis et al.

It is certified that error appears in the above-identified patent and that said Letters Patent is hereby corrected as shown below:

<u>Title page,</u>
Item [57], ABSTRACT,
Line 3, change "component" to -- components --;

<u>Column 3,</u>
Line 50, change "he program" to -- the program --;

<u>Column 6,</u>
Line 62, change "North ridge" to -- North bridge --; and

<u>Column 13,</u>
Line 7, change "12C" to -- $I^2C$ --.

Signed and Sealed this

Twenty-first Day of March, 2006

JON W. DUDAS
*Director of the United States Patent and Trademark Office*